United States Patent [19]

Hesse et al.

[11] 4,413,933
[45] Nov. 8, 1983

[54] PNEUMATIC SUCTION DEVICES

[75] Inventors: Theodor Hesse; Helmut Rieke; Johannes Kleine-König, all of Melle, Fed. Rep. of Germany

[73] Assignee: Engelbrecht & Lemmerbrock GmbH & Co., Melle, Fed. Rep. of Germany

[21] Appl. No.: 305,393

[22] Filed: Sep. 25, 1981

[30] Foreign Application Priority Data

Oct. 3, 1980 [DE] Fed. Rep. of Germany ....... 3037461

[51] Int. Cl.³ ............................................. B65G 53/42
[52] U.S. Cl. .................................... 406/152; 366/191; 366/300
[58] Field of Search ......................... 406/52, 152, 151; 366/191, 194, 300

[56] References Cited

U.S. PATENT DOCUMENTS 3,876,258  4/1975  Abderhalden ................. 406/151 X
4,140,350  2/1979  Bentzen-Bilkuist et al. ........ 406/152

FOREIGN PATENT DOCUMENTS 2055690  4/1972  Fed. Rep. of Germany ...... 406/152
2105143 10/1972  Fed. Rep. of Germany ...... 406/152
747879   6/1933  France .......................... 406/152

Primary Examiner—Andres Kashnikow
Assistant Examiner—L. E. Williams
Attorney, Agent, or Firm—Balogh, Osann, Kramer, Dvorak, Genova & Traub

[57] ABSTRACT

This invention relates to pneumatic suction devices for removing slowly movable material from enclosed storage spaces, of the kind in which a suction pipe secured to a pivotable arm and having a supply of air arranged to be fed to a suction aperture thereof, is provided with peripherally distributed driven tools for loosening the material. According to the invention, at least three axially parallel drivable spindles are distributed around the end of the suction pipe, the spindles carrying, at least at the lower end thereof, tools for loosening the material and conveying it to the suction aperture and the suction pipe. Adjacent ones of the spindles are preferably rotatable in opposite directions, but at least two adjacent spindles out of an odd number of the spindles are rotatable in the same direction. The tools may include strip-shaped radial vane surfaces with bent-over ends substantially parallel to the spindles and arranged at an angle to the direction of rotation.

10 Claims, 8 Drawing Figures

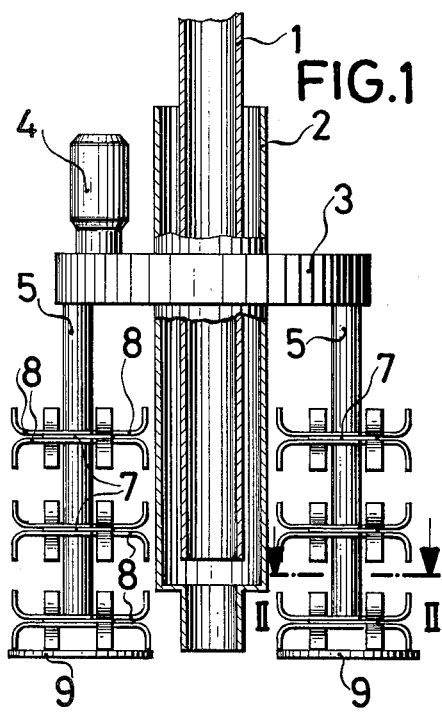
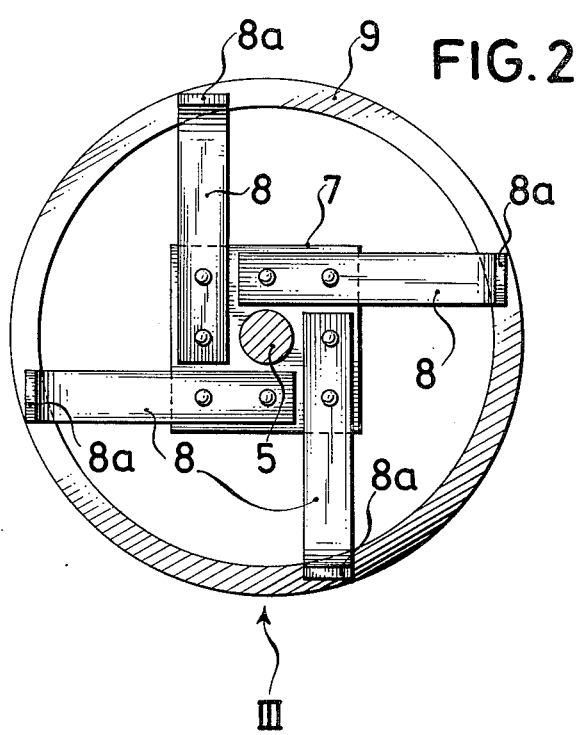
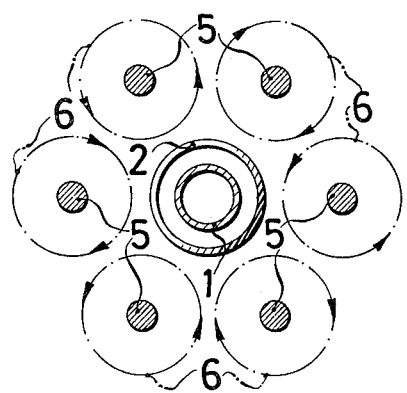
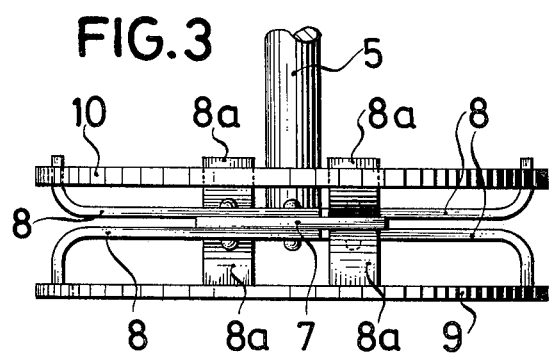

PNEUMATIC SUCTION DEVICES

BACKGROUND OF THE INVENTION

The present invention relates to pneumatic suction devices primarily intended for removing slowly movable material from enclosed storage spaces such as ships' holds, of the kind in which a suction pipe secured to a pivotable arm and having a supply of air arranged to be fed to its suction aperture which is located at its lower end, and is provided with peripherally distributed driven devices for loosening the material. Hereinafter, suction devices of this kind will be referred to as "of the kind described".

It is known that lossening or stirring tools may be made to revolve around the axis of a suction pipe of the kind described, one such device being described in German Patent Specification No. DE-AS 2,055,690. However, in that particular device it is difficult if indeed possible, to extract sluggish materials, e.g. tapioca, by suction from storage spaces, in particular from ships, since steep walls formed in the materials cannot be caused to collapse even by means of pivoting or otherwise movable nozzles at the pipe end. In another case, German Specification No. DE-AS 2,105,143, a double-walled suction head turns around the axis of the suction pipe together with radial conveying tools, so that a considerable torque is thereby applied to the suction pipe and this arrangement is consequently appropriate only for fixed installations, but is not suitable to be positioned on a pivotable arm comprising a freely suspended suction duct for removal by suction of materials from ships in particular.

Particular difficulties arise in all known arrangements if no more than one or two tools engage sideways in the material which is to be conveyed, since the torque or torques cannot be balanced.

It is an object of the invention to reduce or substantially eliminate turning moments applied to a suction pipe of the kind described by loosening tools or at an event to reduce them to a minimum in special cases which remain to be dealt with. It is another object to enable the suction aperture to be displaced vertically downwards as well as sideways into steep walls of the material which is to be conveyed whilst it is being loosened.

SUMMARY OF THE INVENTION

This and other objects are achieved in accordance with the invention by providing at least three axially parallel drivable spindles distributed around the end of the suction pipe, the spindles carrying, at least at the lower ends thereof, tools for loosening the material and/or conveying it to the suction aperture and/or to the suction pipe, adjacent ones of the spindles preferably being rotatable in opposite directions but at least two adjacent spindles out of an add number of said spindles being rotatable in the same direction.

Due to this solution, the material-moving or stirring tools of at least two vertical tool spindles will engage in the material during lateral pivotal displacement of the suction head for lateral excavation of the sluggishly trickling material, so that no turning moments may occur around the axis of the suction pipe even in these cases thanks to the contradirectional rotation of adjacent spindles, and a disintegration of even vertical walls is accomplished in the case of such materials, since the stirring tools not only loosen them but also convey them to the suction aperture or the suction pipe.

Advantageously, the loosening tools are in the form of vanes, since such a configuration enables the tools not only to work themselves sideways but also downwards into the material which is to be conveyed and in doing so entrain the suspended suction pipe whilst carrying along the arm, so that a disintegration and removal by suction of the loosened material which is to be conveyed may be performed in all cases.

It is also of advantage furthermore so to construct the tools such that the weight of the suction pipe is at least partially neutralised since the tools also displace the material downwards from above towards the suction aperture.

Apart from vnes, the tools may be stirring worms, spindle members or blade tools, as will hereinafter be referred to.

BRIEF DESCRIPTION OF THE DRAWINGS

In order that the invention may be more clearly understood, reference will now be made to the accompanying drawings which show certain embodiments thereof by way of example and in which:

FIG. 1 shows an axial section through the suction head of a pneumatic conveying plant comprising material-moving tools in accordance with the invention, FIG. 2 shows an enlarged cross-section along the line II—II of FIG. 1, FIG. 3 shows a sideview looking in the direction III—III of FIG. 2, FIG. 4 shows a diagrammatical horizontal cross-section of the arrangement of FIG. 1.

DETAILED DESCRIPTION OF PREFERRED EMBODIMENTS

Figure 5:
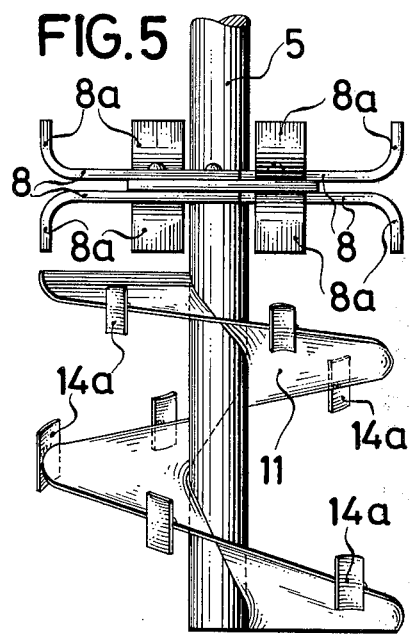
FIG. 5 shows a sideview of partially modified tools, enlarged as compared to FIG. 1.

Referring now to the drawings, in the case of pneumatic conveyor plants which may be taken into consideration in accordance with the invention, the conveying pipe duct is commonly freely suspended from a pivotable arm which is used to lower the suction head and displace it sideways. Such a suction head is shown at 1, surrounded by a jacket 2 for supplying conveying air to the suction aperture, the air-flow being denoted by arrows in FIG. 1, the conveying air entraining the material which is to be conveyed, at the lower end of the suction head.

In accordance with the invention, the suction head 1, 2 is surrounded or embraced by a horizontal housing 3 arranged to accommodate a transmission gear (not specifically shown) driven from a motor 4, and this gear has coupled to it spindles 5 which are journalled parallel to the axis of the suction head and are distributed around the periphery thereof. There are at least three driven spindles 5, but an even number of spindles, e.g. 4 or 6, has greater advantages, with two spindles being opposed with respect to the axis of the suction head, and adjacent spindles being driven so that they rotate in opposite directions i.e. anticlockwise and clockwise. If the number of spindles 5 is an odd number, provision is made to ensure that at least two adjacent spindles are rotated in the same direction.

In accordance with the invention, the spindles 5 are fitted with axially, i.e. vertically-spaced, stirring tools which convey the material which is to be conveyed downwards from above to the suction aperture or suction pipe and/or are arranged to work themselves sideways into the steeply formed walls of material which is to be conveyed and to cause said walls to collapse and the material to be broken up.

The stirring tools which are denoted by 6 in the diagrammatical FIG. 4, may be constructed in a variety of ways as will shortly become evident.

As shown in FIGS. 1 to 3, horizontal supporting plates through which the spindles 5 pass, may be secured to these spindles along their lengths i.e. at vertical intervals in use. Approximately radial sheet metal strips 8 having upwardly-bent ends in the case of the upper tools 8 and downwardly-bent ends in the case of the lower tools, are secured on the upper and/or lower side of these supporting plates 7, to act as stirring vanes. These upper and lower ends are shown at 8a. All the stirring tools 8 have an angle of attack or incidence in the direction of rotation and/or in axial direction, especially in the case of the bent-over ends 8a, so that the stirring vanes 8 are capable of displacing the material which is to be conveyed. sideways and/or downwards from above, for the purpose of thereby reducing the ponderal pressure of the conveyor duct and of the suction head on the material which is to be conveyed, and of working themselves sideways into the material which is to be conveyed under entrainment of the suction head 1, 2, if more or less steep walls of the material have been formed. The sluggishly trickling material which is to be conveyed is in all cases loosened below and beside the suction head and fed to the suction apertures for successful removal.

In order that the lowermost stirring tools 8 on all the tool spindles 5 cannot damage or destroy the floors of storage rooms, e.g. ships' holds, the lowest vanes of all spindles are joined together at the terminal ends of the downwardly-bent over portions 8a by a protective ring 9 extending approximately flush with the lower end of the suction head, which may rest on the floor of the premises without damaging it. Moreover, the tools are surrounded by a protective ring 10 above and/or below one or more of the supporting plates 7 along the outer circumference of the bent-over portions 8a as illustrated in FIG. 3, so that the sidewalls of the storage space are protected from damage by the rotating tools.

Figure 6:
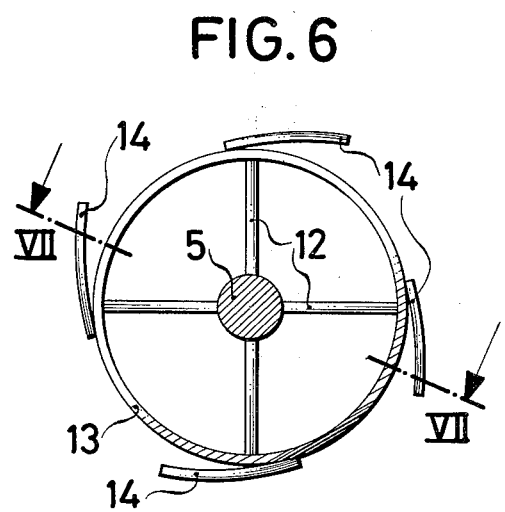
FIG. 6 shows an enlarged cross-section along the line II—II of FIG. 1, but with a modified construction of the tools.
Figure 7:
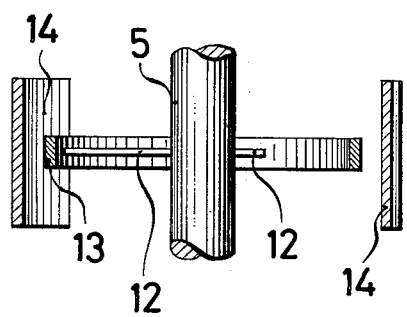
FIG. 7 shows a cross-section along the line VII—VII of FIG. 6.

As shown in FIG. 5, a worm 11 having a downwardly directed conveying action, and which may be provided at its peripheral edge with blade elements 14a installed at an angle of incidence, may be fitted on each spindle 5, or one or more worms 11 may alternate with stirring tools 8 in accordance with FIGS. 2 and 3 along the height of the spindles 5 or with stirring tools 14 in accordance with FIGS. 6 and 7.

According to FIGS. 6 and 7, sets of spokes 12, or rings 13 supported by spokes 12, are secured vertically along the length of the spindles 5. The ends of these spokes, or the rings 13 at their periphery, carry blades 14 at an angle of incidence with respect to the direction of rotation, so that a loosening action on the material which is to be conveyed, and a sideways penetration of the stirring tools may also occur.

Figure 8:
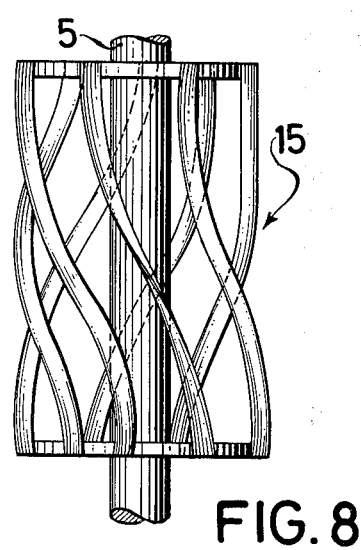
FIG. 8 shows a diagrammatical sideview of another embodiment of stirring tools.

Instead of the worm 11 according to FIG. 5, each spindle 5 may alternatively have fusiform stirring tools 15 secured to it as shown in FIG. 8, these tools being arranged in similar manner to a barrel-type lawn mower and which may convey the material downwards from above and may also work themselves sideways into the material.

It will be apparent that identical or different stirring tools may be fitted alternately on the spindles 5, such tools being of the various kinds illustrated in the accompanying drawings.

We claim:

1. In a pneumatic suction device for removing slowly movable material from enclosed spaces, of the kind including a suction pipe secured to a pivotable arm, and having a suction aperture and a supply of air arranged to be fed to the suction aperture thereof, and provided with peripherally distributed driven tools for loosening the material, the improvement which comprises at least three axially parallel drivable spindles distributed around and above the suction aperture of said suction pipe, said spindles carrying, one above the other, tools for loosening the material sideways for conveying it to said suction aperture and said suction pipe, adjacent ones of said spindles being rotatable in opposite directions, but at least two adjacent spindles out of an odd number of said spindles being rotatable in the same direction.

2. An improved suction device according to claim 1, wherein said tools comprise strip-shaped radial vane surfaces with bent-over ends substantially parallel to said spindle and arranged at an angle to the direction of rotation.

3. An improved suction device according to claim 2, wherein each said spindle has secured thereto along its length at intervals, transversely extending supporting plates to the upper and lower sides of which vane surfaces are secured in approximately opposed positions.

4. An improved suction device according to claim 3, wherein the lowest of said vane surfaces of the lowest of said tools have bent-over ends which are joined to a horizontal ring extending at right angles to said spindle, said ring lying approximately in the same plane as the lower end of said suction pipe.

5. An improved suction device according to claim 4, wherein said vane surfaces situated on one side of at least one of said supporting plates of each said spindle are encircled at their outer circumference by a ring.

6. An improved suction device according to claim 1, wherein horizontal rings are secured least at the lower end of each said spindle, said rings being provided at their outer peripheries with blade means.

7. An improved suction device according to claim 1, wherein sets of spokes are secured at least at the lower end of each said spindle, the outer ends of said spokes being provided with blade means.

8. An improved suction device according to claim 1, wherein said tools each comprise at least one tool arranged in the manner of a barrel-type lawn mower, set at an angle and arranged to convey material in a downwards direction.

9. An improved suction device according to claim 1, wherein individual ones of said spindles carry different tools.

10. In a pneumatic suction device for removing slowly movable material from enclosed spaces of the kind including a suction pipe secured to a pivotable arm and having a suction aperture and a supply of air arranged to be fed to the suction aperture thereof, and provided with peripherally distributed driven tools for loosening the material, the improvement which comprises four or more axially parallel drivable spindles of even number distributed around and above the suction aperture of said suction pipe, said spindles carrying, one above the other, tools for loosening the material sideways for conveying it to said suction aperture and said suction pipe, adjacent ones of said spindles being rotatable in opposite directions.

* * * * *